(12) United States Patent
Knighton

(10) Patent No.: US 9,877,577 B2
(45) Date of Patent: Jan. 30, 2018

(54) STORAGE AND SERVING CART

(71) Applicant: William G. Knighton, Arlington, TX (US)

(72) Inventor: William G. Knighton, Arlington, TX (US)

( * ) Notice: Subject to any disclaimer, the term of this patent is extended or adjusted under 35 U.S.C. 154(b) by 0 days.

(21) Appl. No.: 15/609,734

(22) Filed: May 31, 2017

(65) Prior Publication Data
US 2017/0340105 A1 Nov. 30, 2017

Related U.S. Application Data

(60) Provisional application No. 62/343,525, filed on May 31, 2016.

(51) Int. Cl.
*B62B 3/04* (2006.01)
*A47B 31/00* (2006.01)
*B62B 3/00* (2006.01)

(52) U.S. Cl.
CPC ............. *A47B 31/00* (2013.01); *B62B 3/003* (2013.01); *B62B 3/004* (2013.01); *B62B 3/005* (2013.01); *A47B 2031/002* (2013.01); *A47B 2031/003* (2013.01)

(58) Field of Classification Search
CPC . A47B 31/00; A47B 31/001; A47B 2031/002; A47B 2031/003; B62B 3/002; B62B 3/003; B62B 3/004; B62B 3/005

USPC ............................................ 312/140.1–140.4
See application file for complete search history.

(56) References Cited

U.S. PATENT DOCUMENTS

| | | | | |
|---|---|---|---|---|
| 4,161,234 A * | 7/1979 | Munn | .................... | A47B 31/00 186/52 |
| 4,718,741 A * | 1/1988 | Nichoalds | .............. | A47B 31/00 312/223.6 |
| 5,028,099 A * | 7/1991 | Bertucco | ................. | B65F 1/006 100/34 |
| 5,312,178 A * | 5/1994 | King | .................... | E05B 67/383 269/289 R |
| 6,591,831 B2 * | 7/2003 | Reynolds | ................ | A47J 36/24 108/118 |
| 2004/0140740 A1 * | 7/2004 | Gauss | ....................... | A47F 9/00 312/140.2 |
| 2011/0088974 A1 * | 4/2011 | Bond | ..................... | A47B 13/00 182/129 |
| 2015/0076974 A1 * | 3/2015 | Schreiter | .............. | A47B 17/036 312/140.4 |
| 2015/0115786 A1 * | 4/2015 | Manalang | .............. | B25H 3/028 312/321.5 |

* cited by examiner

*Primary Examiner* — Daniel J Rohrhoff
(74) *Attorney, Agent, or Firm* — James L. Baudino

(57) ABSTRACT

A storage and serving cart includes a cabinet assembly having an internal storage cavity where a plurality of wheels are coupled to a lower portion thereof. A tabletop with an opening therethrough is coupled to an upper surface of the cabinet assembly. A tabletop insert being a laminate structure having first and second sides each of a different material is reversibly positionable within the opening to have either the first or second side facing upwardly from the tabletop.

20 Claims, 3 Drawing Sheets

STORAGE AND SERVING CART

BACKGROUND

Carts are often used to store a variety of items that a person may use occasionally or may need to perform a particular task (e.g., storing/transporting tools, food items, cleaning supplies, etc.). These carts sometimes have wheels or rollers to facilitate their transportability. Although some carts may be open-air carts (i.e., carted items are readily visible), some carts may contain enclosed storage compartments (e.g., drawers, doors, etc.).

BRIEF SUMMARY

According to one aspect of the present disclosure, a storage and serving cart includes a cabinet assembly having a base member having a plurality of wheels coupled to a lower portion thereof, and a plurality of side panels each having a first end coupled to the base member where the side panels extend upwardly from the base member having a second end thereof coupled to a tabletop. One or more doors are movably coupled to the cabinet assembly. The base member, tabletop, side panels, and doors form an internal storage cavity. The tabletop includes an opening disposed over the internal storage cavity. A tabletop insert being a laminate structure has first and second sides each of a different material and is reversibly positionable within the opening to have either the first or second side facing upwardly from the tabletop.

According to another embodiment of the present disclosure, a storage and serving cart includes a cabinet assembly having an internal storage cavity with a plurality of wheels coupled to a lower portion thereof. A tabletop with an opening therethrough is coupled to an upper surface of the cabinet assembly. A tabletop insert being a laminate structure having first and second sides each of a different material is reversibly positionable within the opening to have either the first or second side facing upwardly from the tabletop. The tabletop insert also including an opening therethrough.

According to another embodiment of the present disclosure, a storage and serving cart includes a cabinet assembly having a base member having a plurality of wheels coupled to a lower portion thereof, and a plurality of side panels each having a first end coupled to the base member where the side panels extend upwardly from the base member having a second end thereof coupled to a tabletop. One or more doors are movably coupled to the cabinet assembly. The base member, tabletop, side panels, and doors form an internal storage cavity. The tabletop includes a medially located opening extending therethrough and disposed over the internal storage cavity. The tabletop also includes first and second distal openings extending therethrough and located beyond a periphery of the cabinet assembly. A laminate tabletop insert having a first metallic side and a second non-metallic side is reversibly positionable within the medially located opening to have either the first or second side facing upwardly from the tabletop. The tabletop insert also includes an opening extending therethrough and located proximate to and spaced apart from a distal end of the tabletop insert.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a storage and serving cart that may be used to perform a variety of functions and/or meet a variety of needs. According to one embodiment, a cart includes a tabletop and a cabinet assembly. The cabinet assembly has a base member having a plurality of wheels coupled to a lower portion thereof, and a plurality of side panels each having a first end coupled to the base member where the side panels extend upwardly from the base member having a second end thereof coupled to the tabletop. One or more doors may be movably coupled to the cabinet assembly. The base member, tabletop, side panels, and doors form an internal storage cavity. The tabletop includes an opening disposed over the internal storage cavity. A tabletop insert being a laminate structure has first and second sides each of a different material where the tabletop insert is reversibly positionable within the opening to have either the first or second side facing upwardly from the tabletop. In some embodiments, the tabletop insert may have a metallic side and a non-metallic side, and in some embodiments tabletop insert may also have an opening extending therethrough into the storage cavity to facilitate the removal of items from an upwardly facing surface of the tabletop insert.

Figure 1:
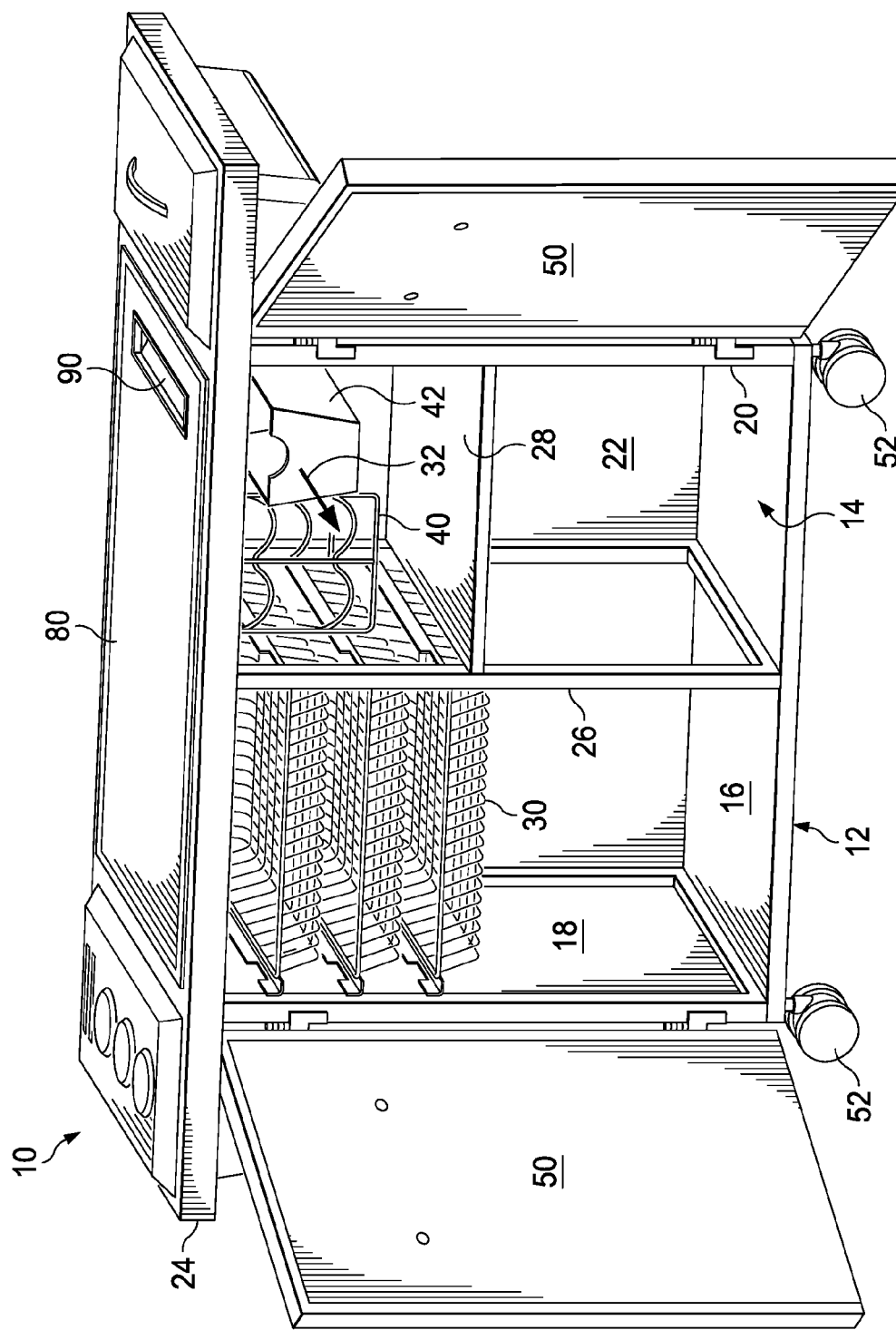
FIG. 1 is a diagram illustrating a top perspective view of a storage and serving cart according to the present disclosure.
Figure 2:
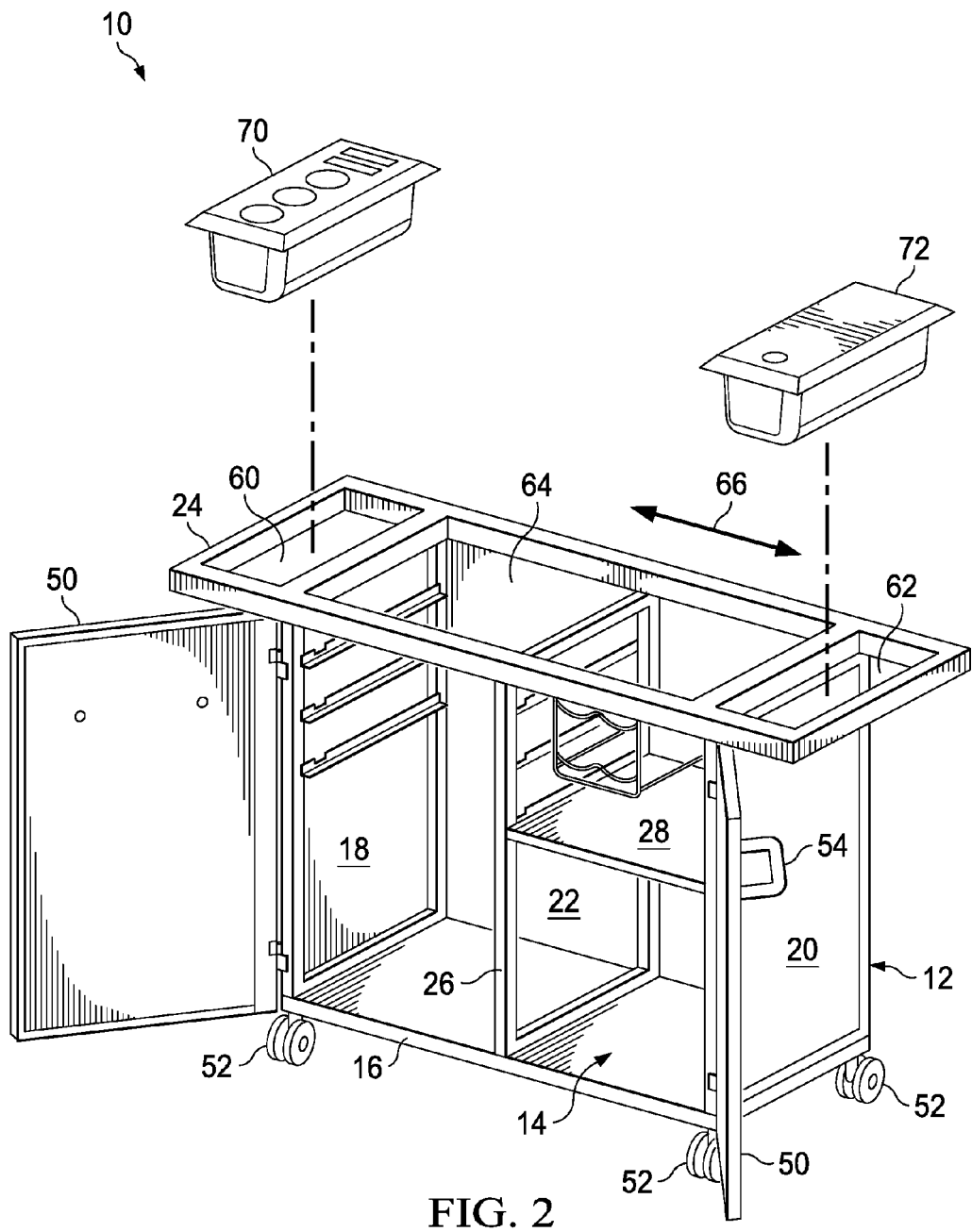
FIG. 2 is a diagram illustrating another top perspective view of the storage and serving cart of FIG. 1 according to the present disclosure with various items omitted from view.
Figure 3:
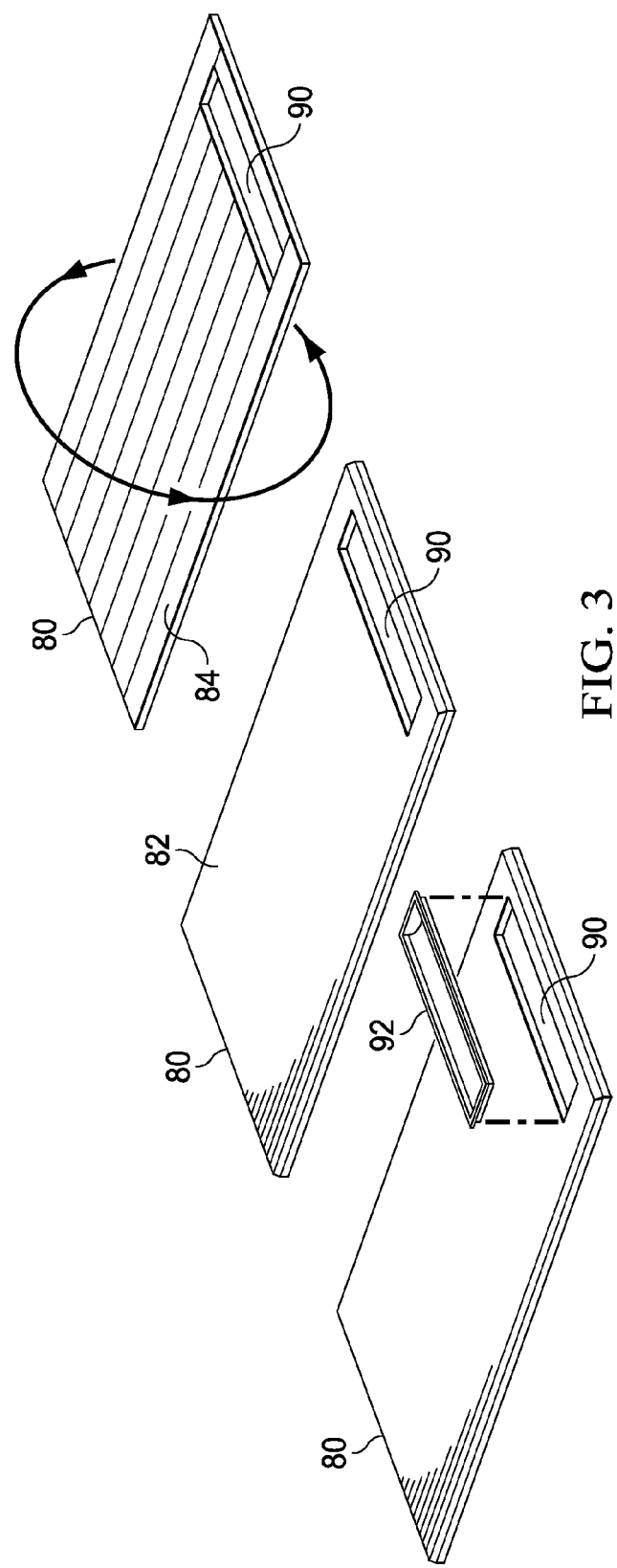
FIG. 3 is a diagram illustrating an enlarged view of a tabletop insert of the storage and serving cart of FIGS. 1 and 2 according to the present disclosure.

With reference now to the Figures and in particular with reference to FIGS. 1-3, diagrams illustrating a cart 10 according to the present disclosure is illustrated. FIG. 1 is a diagram illustrating a top perspective view of a storage and serving cart according to the present disclosure; FIG. 2 is a diagram illustrating another top perspective view of the storage and serving cart of FIG. 1 according to the present disclosure with various items omitted from view; and FIG. 3 is a diagram illustrating an enlarged view of a tabletop insert of the storage and serving cart of FIGS. 1 and 2 according to the present disclosure.

In the illustrated embodiment, cart 10 is configured having a generally rectangular shape. However, it should be understood that cart 10 may be differently configured having other shapes (e.g., elliptical, round, square, etc.). In the illustrated embodiment, cart 10 includes a cabinet assembly 12 for creating/providing an internal and/or closable storage cavity 14. In the illustrated embodiment, assembly 12 includes a base member 16, a left side panel 18, a right side panel 20, and a rear or back side panel 22. Panels 18, 20, and 22 may each be formed as a single, unitary element or may be formed from multiple elements (e.g., multiple side-by-side panel elements secured adjacent to each other). In the illustrated embodiment, each panel 18, 20, and 22 has a lower end thereof coupled to the base member 16, and each panel 18, 20, and 22 extends vertically upward having a second end thereof coupled to a tabletop 24.

One or more support elements 26 may also be included in assembly 12 to provide a desired rigidity, strength, and/or storage adaptability. For example, in the illustrated embodiment, a single support element 26 is located vertically at a medial location within storage cavity 14 extending vertically from base member 16 to tabletop 24. Support element 26 provides support for tabletop 24 while also serving as an attachment structure for various storage items. For example, in the illustrated embodiment, assembly 12 includes a removable divider 28 being horizontally positioned within storage cavity between support element 26 and right panel 20 to vertically separate or divide a vertical storage cavity 14 space into two smaller-sized storage cavity 14 spaces. One or more removable and/or slidable storage baskets and/or containers 30 are located within cavity 14 and extend horizontally from support element 26 to left side panel 18 such that containers 30 may be slid outwardly from storage cavity 14 in the direction indicated by 32 and slid inwardly in reverse thereto. In FIG. 1, a removable beverage rack/holder 40 and a removable container/tray 42 are also located within storage cavity 14 located above divider 28 and between support element 26 and right side panel 20. Holder 40 may be used to hold and/or store various types of bottles, cans, or other types of beverage/liquid containers. In the illustrated embodiment, tray 42 may be slid outwardly in the direction 32 and removed from cart 10 and slid inwardly in a reverse direction to return tray 42 to being within storage cavity 14. In the illustrated embodiment, tray 42 is configured having an elongate shape in the form of an open-sided trapezoid; however, it should be understood that tray 42 may be otherwise configured.

In the illustrated embodiment, one or more doors 50 are movably coupled to a forward-facing side of cabinet assembly 12 such that doors 50 (when closed) in combination with base member 16, panels 18, 20, and 22, and tabletop 24 form an internal and closable storage cavity 14 (i.e., items within storage cavity 14 may be protected from the environment and/or be otherwise hidden from view). In the illustrated embodiment, each door 50 is movably coupled to cabinet assembly 12 via a pair of hinges; however, it should be understood that doors 50 may be otherwise coupled to cabinet assembly 12. Further, it should be understood that other types of closable elements may be used (e.g., sliding doors, a drape, etc.). In the illustrated embodiment, a roller or wheel 52 is coupled to each lower corner of cabinet assembly 12 (e.g., coupled to each corner of base member 16) to enable a rolling portability of cart 12. Handles 54 may also be secured to doors 50 to facilitate the opening/closing thereof relative to cabinet assembly 12.

As best illustrated in FIG. 2, tabletop 24 includes a left side distal opening 60, a right side distal opening 62, and a medially located opening 64 each extending therethrough where opening 64 is disposed between openings 60 and 62 relative to a longitudinal direction 66 of cart 10. In the illustrated embodiment, opening 64 is disposed over storage cavity 14 while openings 60 and 62 are located outside a periphery of cabinet assembly 12 (e.g., located exterior to panels 18 and 20, respectively). In the illustrated embodiment, each opening 60, 62, and 64 is rectangularly-shaped; however, it should be understood that openings 60, 62, and 64 may be otherwise shaped (e.g., elliptical, square, round, etc.). In the illustrated embodiment, cart 10 includes receptacle units 70 and 72 having shapes/configurations complementary to respective openings 60 and 62 such that receptacle units 70 and 72 may be removably disposed within respective openings 60 and 62. Receptacle units 70 and 72 may be configured with covers, internal receptacles, etc., according to desired storage functions (e.g., configured as a drink/cup holder, ice chest or cooler, utensil holder, etc.).

Cart 10 also includes a tabletop insert 80 disposable within opening 64. As best illustrated in FIG. 3, in some embodiments, insert 80 is formed of a laminate structure/assembly to facilitate different types of materials on each side thereof. For example, in some embodiments, insert 80 may comprise a metallic side 82 (e.g., stainless steel, copper, etc.) and a non-metallic side 84 (e.g., plastic, wood, etc.). It should be understood that insert 80 may also be formed from a single material (e.g., a unitary material throughout) or be formed as a laminate structure having other types of materials (e.g., all metallic, all non-metallic, etc.).

Insert 80 is reversibly disposable within opening 64 such that side 82 or side 84 may be disposed facing upwardly for use thereof by a user of cart 10. In some embodiments, insert 80 also includes an opening 90 extending therethrough near and spaced apart from a distal longitudinal end of insert 80. In some embodiments, opening 90 is located in alignment with and above tray 42 such that opening 90 may be used to facilitate the removal of objects/debris from an upwardly facing surface of insert 80 into tray 42 located beneath insert 80. Thus, for example, if using insert 80 for food preparation, discarded food items may be swept across an upwardly facing surface of insert 80 and into opening 90, where such discarded items may be collected by tray 42 (which may then be removed from cart 10 to dispose the discards). In the illustrated embodiment, opening 90 comprises an elongate opening extending in a lateral direction relative to insert 80 (e.g., sized to correspond to an elongate size/shape of tray 42). In the illustrated embodiment, opening 90 $p$ comprises a rectangular shape; however, it should be understood that opening 90 may be otherwise configured (e.g., circular, elliptical, square, etc.). Tabletop 24 may be configured having a lip or flange extending about a periphery of opening 64 disposed below an upper surface of tabletop 24 at an approximate depth equal to a thickness of tabletop insert 80 such that an upper surface of tabletop insert 80 is disposed flush (i.e., flush or substantially flush) with adjacent upper surfaces of tabletop 24 when insert 80 is disposed within opening 64. However, it should be understood that tabletop 24 and/or insert 80 may be otherwise configured (e.g., insert 80 may loosely lay on or be supported underneath by one or more support cross members of tabletop 24, insert 80 and/or opening 64 may have a seal/grommet disposed about its periphery to facilitate a tight seal/fit between adjacent surfaces of tabletop 24 about a periphery of opening 64 (e.g., a pressfit assembly) and insert 80, tabletop 24 may have spaced apart tabs about a periphery of opening 64 for supporting insert 80 within opening 64, etc.).

In some embodiments, an insert 92 may be removably disposable within opening 90 of insert 80 to close opening 90 if desired. For example, in some embodiments, insert 92 may comprise a plug or seal formed of a rubber or other type of material that may be used to close opening 90 when opening 90 is not in use or is not desired to be used.

Thus, embodiments of the present disclosure provide a storage and serving cart 10 that enables a user to reverse sides/surfaces of an upwardly facing surface of the cart 10 to accommodate different uses/purposes. For example, a user may use one side on insert 80 to accommodate food preparation and then flip or reverse the orientation of insert 80 to have a second, different side facing upwardly to accommodate a display/service of food items (or other types of objects). Opposite surfaces and/or sides 82,84 of insert may be specially configured to accommodate a desired purpose (e.g., preparation versus service). When using insert 80, opening 90 may be used to conveniently remove objects from an upper surface of insert 80 (e.g., into tray 42 disposed under insert 80 and hidden from view being within storage cavity 14).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A storage and serving cart, comprising:
   a tabletop;
   a cabinet assembly including:
      a base member having a plurality of wheels coupled to a lower portion thereof; and
      a plurality of side panels each having a first end coupled to the base member, the side panels extending upwardly from the base member having a second end thereof coupled to the tabletop;
   one or more doors movably coupled to the cabinet assembly;
   wherein the base member, the tabletop, the side panels, and the doors form an internal storage cavity;
   wherein the tabletop includes an opening disposed over the internal storage cavity; and
   a tabletop insert being a laminate structure having first and second sides each of a different material, the tabletop insert reversibly positionable within the opening to have either the first or second side facing upwardly from the tabletop.

2. The cart of claim 1, wherein the tabletop insert comprises an opening formed therethrough, and further comprising a tray removable disposed within the storage cavity and located beneath the opening in the tabletop insert.

3. The cart of claim 2, further comprising another insert removably disposable within the opening of the tabletop insert to close the opening in the tabletop insert.

4. The cart of claim 1, wherein the tabletop insert comprises a metallic first side and a non-metallic second side.

5. The cart of claim 1, wherein the plurality of side panels comprises a left side panel, a right side panel, and a rear side panel, and wherein the opening in the tabletop extends from the left side panel to the right side panel.

6. The cart of claim 5, wherein the opening in the tabletop insert is located proximate to the left or right side panel.

7. The cart of claim 1, wherein the opening in the tabletop extends to a length and a width corresponding to a length and a width of the internal storage cavity.

8. A storage and serving cart, comprising:
   a cabinet assembly having an internal storage cavity, the cabinet assembly including a plurality of wheels coupled to a lower portion thereof; and
   a tabletop with an opening therethrough coupled to an upper surface of the cabinet assembly; and
   a tabletop insert being a laminate structure having first and second sides each of a different material, the tabletop insert reversibly positionable within the opening to have either the first or second side facing upwardly from the tabletop, the tabletop insert including an opening therethrough.

9. The cart of claim 8, further comprising a tray removably disposed within the storage cavity and located beneath the opening in the tabletop insert.

10. The cart of claim 9, further comprising another insert removably disposable within the opening of the tabletop insert to close the opening in the tabletop insert.

11. The cart of claim 8, wherein the tabletop has first and second longitudinal ends, and wherein the opening in the tabletop insert is located proximate to one of the first or second longitudinal ends.

12. The cart of claim 11, wherein the opening in the tabletop insert comprises an elongate opening extending in a lateral direction of the tabletop insert.

13. The cart of claim 8, wherein the opening in the tabletop comprises a medial opening, and wherein the tabletop further comprises first and second distal openings disposed on opposite sides of the medial opening ands extending through the tabletop.

14. The cart of claim 13, further comprising a receptacle unit removably disposed within each of the first and second distal openings.

15. The cart of claim 8, wherein the tabletop insert comprises a metallic first side and a non-metallic second side.

16. A storage and serving cart, comprising:
   a tabletop;
   a cabinet assembly including:
      a base member having a plurality of wheels coupled to a lower portion thereof; and
      a plurality of side panels each having a first end coupled to the base member, the side panels extending upwardly from the base member having a second end thereof coupled to the tabletop;
   one or more doors movably coupled to the cabinet assembly;
   wherein the base member, the tabletop, the side panels, and the doors form an internal storage cavity;
   wherein the tabletop includes a medially located opening extending therethrough and disposed over the internal storage cavity, the tabletop including first and second distal openings extending therethrough and located beyond a periphery of the cabinet assembly; and
   a laminate tabletop insert having a first metallic side and a second non-metallic side, the tabletop insert reversibly positionable within the medially located opening to have either the first or second side facing upwardly from the tabletop, the tabletop insert including an opening extending therethrough and located proximate to and spaced apart from a distal end of the tabletop insert.

17. The cart of claim 16, wherein the opening in the tabletop insert is an elongate opening.

18. The cart of claim 17, further comprising an elongate tray removably disposed within the storage cavity and located beneath the opening in the tabletop insert.

19. The cart of claim 17, wherein the elongate opening in the tabletop insert is a rectangular opening.

20. The cart of claim 16, further comprising a receptacle unit removably disposed within each of the first and second distal openings.

* * * * *